H. K. KOUYOUMJIAN.
COMMUTATOR CONSTRUCTION.
APPLICATION FILED DEC. 18, 1913.
1,219,565.
Patented Mar. 20, 1917.
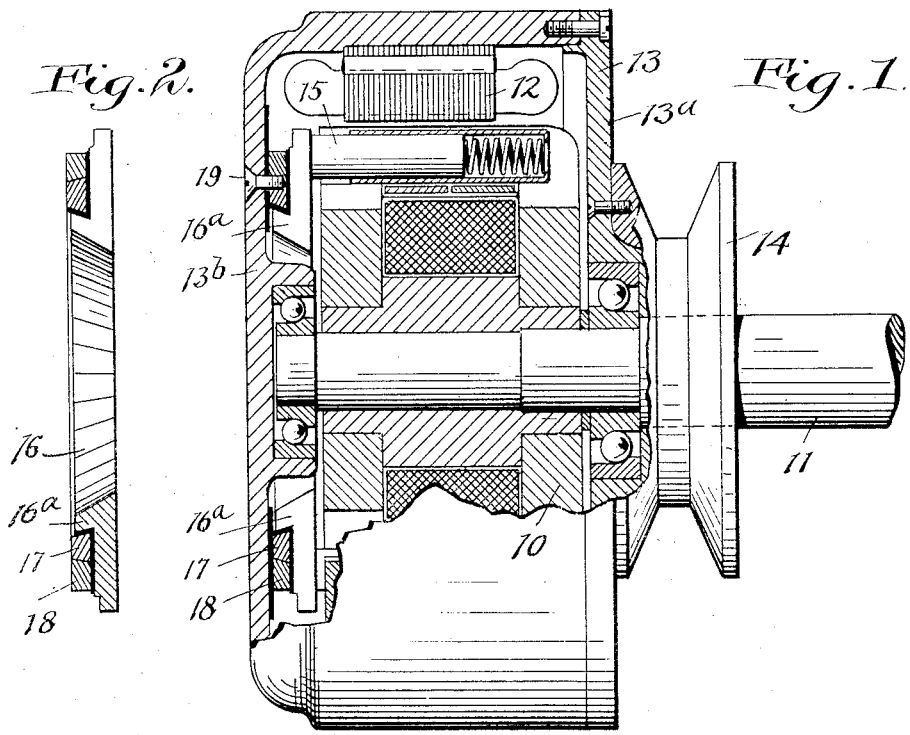
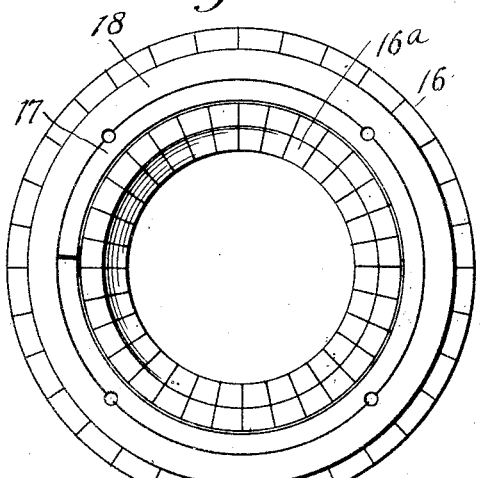
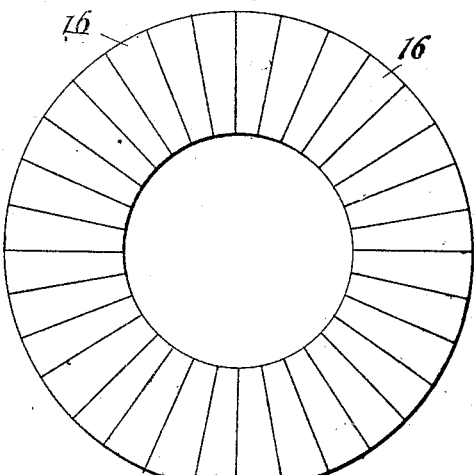
Witnesses
E. B. Gilchrist
L. I. Porter
Inventor
Haroutiun K. Kouyoumjian
by Thurston & Kwis
Attys.

UNITED STATES PATENT OFFICE.

HAROUTIUN K. KOUYOUMJIAN, OF CLEVELAND, OHIO, ASSIGNOR TO THE KEMCO ELECTRIC MANUFACTURING COMPANY, OF CLEVELAND, OHIO, A CORPORATION OF OHIO.

COMMUTATOR CONSTRUCTION.

1,219,565.  Specification of Letters Patent.  Patented Mar. 20, 1917.

Application filed December 18, 1913. Serial No. 807,382.

*To all whom it may concern:*

Be it known that I, HAROUTIUN K. KOUYOUMJIAN, a subject of the Sultan of Turkey, residing at Cleveland, in the county of Cuyahoga and State of Ohio, have invented a certain new and useful Improvement in Commutator Construction, of which the following is a full, clear, and exact description.

This invention relates to commutators and has for its chief object to provide a commutator which occupies a minimum of space axially of the machine in which the commutator is used, and which is extremely rigid and durable.

Although my invention is not limited to any particular type of dynamo electric machine, it has special utility in machines adapted to be employed on motor vehicles, and particularly in a generator which in accordance with one of my prior inventions is adapted to be combined with a radiator cooling fan and mounted on the fan bracket between the radiator and engine of the motor vehicle. In order that this may be done, it is essential that the machine be extremely compact and small or narrow in an axial direction, inasmuch as the space between the radiator and engine in most motor vehicles is quite limited.

The machine which I have designed, although of ample current output, is so proportioned and the parts thereof are so arranged that installation between the radiator and engine is possible, and the attainment of this object is due in large measure to the commutator construction which constitutes the subject matter of the present invention.

My invention may be here briefly summarized as consisting in certain novel details of construction and combinations and arrangements of parts which will be described in the specification and set forth in the appended claims.

In the accompanying sheet of drawings, Figure 1 is a side view of a direct current generator, in which my invention is embodied, parts being shown in elevation and parts in section; Fig. 2 is a sectional view of the commutator detached; Fig. 3 is a side view of the commutator; and Fig. 4 is a similar view looking at the commutator from the opposite side to that shown in Fig. 3.

In the drawings, I have shown a dynamo electric machine in which as before stated, my invention has particular utility, viz: a direct current generator for use on motor vehicles for lighting and battery charging purposes. This machine includes an inner stationary field member 10 mounted upon a fixed shaft 11, and an outer rotary armature 12, which is secured to and rotates with a casing 13 which is adapted to be driven by a belt engaging a pulley 14 secured to the end wall 13ª of the casing. Within the casing and adjacent the opposite end wall 13ᵇ thereof is a commutator forming the subject matter of this invention. This commutator is not of the cylindrical type commonly employed in dynamo electric machines, but in order that it will occupy but little space axially of the machine, I make the same in the form of a flat annulus having on its inner side a flat brush surface which is adapted to be engaged by commutator brushes, one of which is shown at 15, these brushes being supported by the inner stationary field element 10.

The commutator includes a plurality of radial wedge-shaped co-planar segments 16, each of which is substantially L-shaped, being provided with a radial body portion, and at its inner end being provided with an inclined projection 16ª extending toward and substantially to the end wall 13ᵇ. When the segments are assembled, the projections 16ª form at the inner periphery of the annulus an undercut annular flange.

The segments are retained in assembled relationship by annular retaining means consisting of two rings 17 and 18 which engage and are secured to the end wall 13ᵇ of the casing. The two rings are arranged concentrically with respect to each other, the inner ring being a split elastic ring which tightly grips the flange formed by the projections of the assembled segments. The outer ring 18 is a continuous ring which fits tightly onto and holds the split ring in place. Preferably, the engaging surfaces of the two rings are tapered, as shown in the lower part of Fig. 1, and preferably the outer ring is shrunk onto the inner ring. That is, before being placed on the inner ring, it is heated, and when it cools and hence contracts, the outer ring will be drawn very tightly against the inner ring, thus clamping the latter tightly against the segments. Then the segments and the two rings are fastened to the end wall 13b of the machine by screws 19, which pass through or into threaded openings formed at the junction of the two rings, so that the screws will engage both rings. In this manner, the screws serve to securely fasten the commutator to the casing and assist in holding the two rings in assembled relationship. It will be understood, of course, that the segments are properly insulated from one another and will be separated from the retaining rings by interposed insulation which may be mica. The rings may also be separated from the end wall 13b by mica.

It will be observed that the retaining rings engage the segments between their inner and outer ends, leaving the outer ends free. This is desirable in order that the coils of the commutator may be readily connected to the segments, the connections not being shown in this instance,—it being understood that they may be soldered to the segments in the usual manner.

The taper at the inner periphery of the commutator is desirable for the reason that by reason of this taper, the commutator serves as an oil guard, for if any oil from the bearing drops onto the commutator, it will be thrown outwardly toward the end wall 13b by centrifugal force, and will not pass onto the brush engaging face of the commutator.

It will be seen from the drawing that the specific objects of this invention, that is minimum of width axially of the machine, and compactness, durability and rigidity are attained in this construction.

Although I have stated one important field of use of my invention, viz: as a generator for motor vehicles especially adapted to be supported at one given point of the vehicle, I wish it to be understood that my invention has a broader field of use and may be employed in other types of dynamo electric machines, regardless of the specific purpose for which they may be used.

Having thus described my invention, what I claim is:

1. A commutator unit comprising a flat annulus composed of a plurality of segments extending outwardly in the same plane, said segments having on one side a flat brush surface and on the other side having a laterally projecting undercut flange, a split clamping ring engaging said flange and a continuous ring surrounding and tightly fitted on said split ring, said split ring and continuous ring having outer alined flat faces forming a substantially uninterrupted flat clamping face adapted to be clamped against a support.

2. In a commutator construction, a flat commutator support, a commutator composed of a plurality of segments arranged in the same plane, said segments having a flat brush surface and provided on the side next to the support with a laterally projecting undercut flange, annular segment retaining means comprising a split clamping ring engaging the flange, a continuous ring fitted tightly onto said split ring, and screws passing through said support into the segment retaining means for clamping the latter against the support.

3. In combination in a commutator construction, a commutator support, a commutator composed of a plurality of segments arranged in the same plane and provided on one side with a brush surface and on the other side with an undercut flange, a split clamping ring engaging the flange, a continuous ring tightly fitted onto the split ring, and means for clamping the outer faces of said two rings against the support comprising screws passing through the support and engaging both said rings.

In testimony whereof, I hereunto affix my signature in the presence of two witnesses.

HAROUTIUN K. KOUYOUMJIAN.

Witnesses:
A. F. KWIS,
A. J. HUDSON.